(12) United States Patent
Kacperski

(10) Patent No.: US 12,119,665 B1
(45) Date of Patent: Oct. 15, 2024

(54) MAGNETIC IMPULSE BATTERY CHARGER AND METHODS OF USE

(71) Applicant: One Energetics LLC, Brooklyn, NY (US)

(72) Inventor: Alan J. Kacperski, Willoughby, OH (US)

( * ) Notice: Subject to any disclaimer, the term of this patent is extended or adjusted under 35 U.S.C. 154(b) by 0 days.

(21) Appl. No.: 18/389,102

(22) Filed: Nov. 13, 2023

(51) Int. Cl.
| | | |
|---|---|---|
| *H01M 10/44* | (2006.01) | |
| *H01M 10/46* | (2006.01) | |
| *H02J 7/00* | (2006.01) | |
| *H02J 50/10* | (2016.01) | |

(52) U.S. Cl.
CPC .......... *H02J 50/10* (2016.02); *H01M 10/44* (2013.01); *H02J 7/0013* (2013.01); *H02J 7/0034* (2013.01); *H02J 7/0042* (2013.01); *H02J 7/0047* (2013.01); *H02J 7/0069* (2020.01); *H02J 7/00712* (2020.01)

(58) Field of Classification Search
CPC ...... H02J 7/0013; H02J 7/0034; H02J 7/0042; H02J 7/0069; H02J 7/0047; H02J 7/000712; H02J 50/10; H01M 10/44; H01M 10/46
USPC ............... 320/107, 125, 139, 141, 145, 155
See application file for complete search history.

(56) References Cited

U.S. PATENT DOCUMENTS

| | | | |
|---|---|---|---|
| 3,777,247 A | 12/1973 | Zellmer | |
| 4,236,107 A | 11/1980 | Templin | |
| 9,667,132 B2 | 5/2017 | Ghosh | |
| 2010/0181963 A1 | 7/2010 | Schreiber | |
| 2014/0253022 A1 | 9/2014 | Zhou | |

FOREIGN PATENT DOCUMENTS

| | | | |
|---|---|---|---|
| EP | 0564726 A1 | * | 10/1993 |
| EP | 3747117 | | 8/2021 |

* cited by examiner

*Primary Examiner* — Edward Tso

(57) ABSTRACT

A battery charger for impulse charging of a battery includes first and second charging contacts to connect to the battery, first and second terminals to connect to a source of direct current (SDC), an inductor, a current sensor, a switching module, and a controller. The controller alternates the switching module between first and second configurations in response to a signal from the current sensor indicating that the current between the inductor and the first and second terminals exceeds a predetermined threshold value. The inductor is connected to the first and second terminals in the first configuration, thereby allowing the SDC to magnetically energize the inductor. The inductor is isolated from the SDC and is engaged to the battery in the second configuration, via first and second charging contacts, thereby enabling magnetic energy that is stored in the inductor to pass as direct current to the battery.

25 Claims, 6 Drawing Sheets

MAGNETIC IMPULSE BATTERY CHARGER AND METHODS OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to battery chargers and more particularly pertains to a new battery charger for the magnetic impulse charging of a battery. It is desired to provide a battery charger that can charge a battery in a short time, extend the usable life of the battery by reducing heat generated during charging, and restore a battery's chemical composition toward its original condition.

(2) Description of Related Art Including Information Disclosed Under 37 CFR 1.97 and 1.98

The prior art relates to battery chargers and, in particular, to impulse battery chargers that are grounded, isolated, or both. The prior art includes U.S. Pat. Nos. 11,342,776 and 11,710,978, which share a common inventor (Kacperski, Alan) with the current invention and that claim a grounded impulse battery charger. These two references, while demonstrating advantages over the prior art, such as the restoring, charging, and discharging capabilities of batteries and extending battery life, were not applicable to many real-world applications. Such real-world applications include the charging of electric vehicle batteries as well as the charging of home, commercial, and grid-scale batteries. Redesigning the prior art impulse chargers to include additional elements rendering them grounded and more broadly applicable to real world applications, however, remained a challenge.

Furthermore, while the prior art also includes impulse battery chargers whereby a battery is isolated from an electrical source during charging due, at least in part, to a discharge coil that is physically separated from a charge coil, but these isolated battery chargers do not have the advantages of restoring the charging and discharging capabilities of batteries and do not provide extension of battery life.

Brief Summary of the Invention

An embodiment of the disclosure meets the needs presented above by generally comprising first and second charging contacts, each of which is configured to receive a respective charging terminal of a battery to be charged. First and second terminals are configured to electrically connect to a source of direct current (SDC). A switching module is operationally engaged to an inductor enabling selective engagement of the inductor with the battery and selective isolation of the inductor from the SDC. A current sensor is configured to measure current flowing between the inductor and the first and second terminals. A controller is operationally engaged to the current sensor and the switching module to alternate the switching module between first and second configurations in response to a signal from the current sensor indicating that the current between the inductor and the first and second terminals exceeds a predetermined threshold value. The inductor is connected to the first and second terminals in the first configuration, thereby allowing the SDC to magnetically energize the inductor. The inductor is isolated from the SDC and is engaged to the battery in the second configuration, thereby enabling magnetic energy that is stored in the inductor to pass as direct current to the battery to charge the battery.

Another embodiment of the disclosure includes a grounded impulse battery charger wherein the inductor comprises an induction coil and the switching module comprises a first transistor, a second transistor, an optical gate driver, a grounded diode, and a rectifier diode. In the first configuration, the first and second transistors are "on" and the grounded and rectifier diodes are "off" so that the induction coil is connected to the first and second terminals, thereby allowing the SDC to magnetically energize the induction coil. In the second configuration, the first and second transistors are "off" and the grounded and rectifier diodes are "on" so that the induction coil is disconnected from the first and second terminals and is connected across the first and second charging contacts, thereby enabling magnetic energy stored in the induction coil to discharge to the battery.

Yet another embodiment of the disclosure includes an isolated impulse battery charger comprising a charge coil and a discharge coil. The switching module of this embodiment comprises a transistor and a current limiter. In the first configuration, the transistor is "on" and the current limiter is "off" so that the charge coil is connected to the first and second terminals, thereby allowing the SDC to magnetically energize the charge coil. In the second configuration, the transistor is "off" and the current limiter is "on" so that the charge coil is disconnected from the first and second terminals and so that the discharge coil is connected across the first and second charging contacts. Thus, magnetic energy that is stored in the charge coil transfers to the discharge coil and then to the battery.

Still yet another embodiment of the disclosure includes a method of charging a battery entailing provision of an impulse battery charger, according to the disclosure above. Steps of the method include connecting the impulse battery charger to an SDC using the first and second terminals, connecting a battery to the impulse battery charger using the first and second charging contacts, placing the switching module into the first configuration to charge the inductor while the battery is isolated from the SDC by the switching module, measuring a current level between the inductor and the first and second terminals, signaling of the current sensor to the controller when a current level exceeds a predetermined threshold, placing the switching module into the second configuration so that the inductor discharges to the battery while being isolated from the SDC by the switching module, and returning to the first step until the battery is charged.

Still yet another embodiment of the disclosure includes a method of conditioning a battery, which entails the steps of the charging method above, fully discharging the battery, and repeating the process four to twelve times.

There has thus been outlined, rather broadly, the more important features of the disclosure in order that the detailed description thereof that follows may be better understood, and in order that the present contribution to the art may be better appreciated. There are additional features of the disclosure that will be described hereinafter and that will form the subject matter of the claims appended hereto.

The objects of the disclosure, along with the various features of novelty that characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
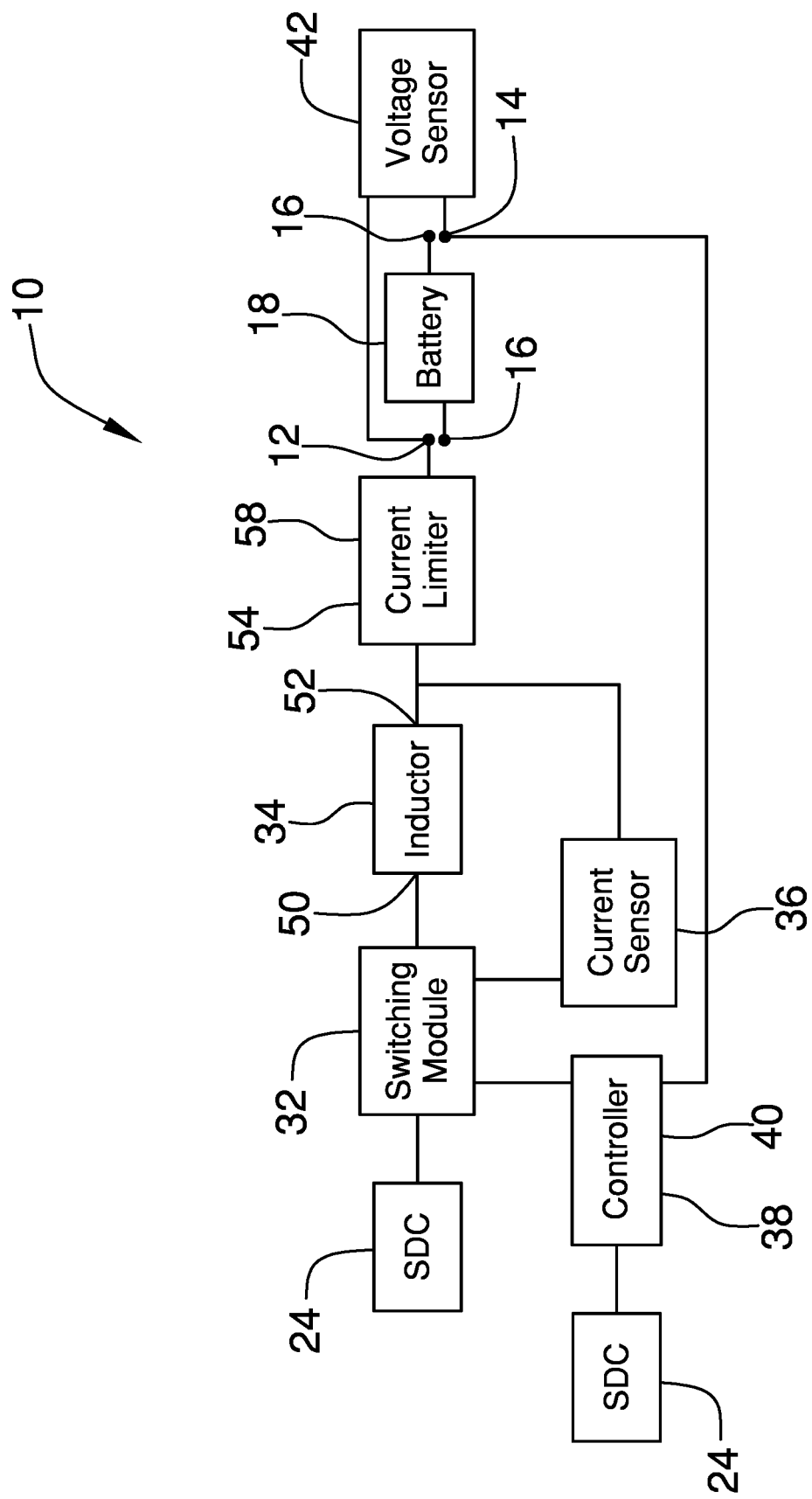
FIG. 1 is a block diagram of an impulse battery charger according to an embodiment of the disclosure.

With reference now to the drawings, and in particular to FIGS. 1 through 6 thereof, a new battery charger embodying the principles and concepts of an embodiment of the disclosure and generally designated by the reference numeral 10 will be described.

Certain terminology is used in the following description for convenience only and is not limiting. The words "a" and "an", as used in the claims and in the corresponding portions of the specification, mean "at least one." References that include a numerical parameter would include variations that, using mathematical and industrial principles accepted in the art (e.g., rounding, measurement or other systematic errors, manufacturing tolerances, etc.), would not vary the least significant digit.

As best illustrated in FIGS. 1 through 6, the impulse battery charger 10 generally comprises a first charging contact 12 and a second charging contact 14, each of which is configured to receive a respective charging terminal 16 of a battery 18 to be charged. In some embodiments, the impulse battery charger 10 may be dedicated for use with a single type of battery 18. In other embodiments, the impulse battery charger 10 may be adaptable for use with different types of batteries 18 and be configured to allow for manual and/or automatic adjustment to the necessary operation conditions.

The impulse battery charger 10 is intended for use with one or more batteries 18, preferably batteries 18 that are rechargeable and which comprise lithium-ion (Li-ion), sodium-ion (Na-ion), potassium-ion (K-ion), nickel-cadmium (NiCd), nickel-metal hydride (NiMH), alkaline, lead-acid, or the like, as well as solid state and iron air batteries. At least one battery 18 may be connected to the impulse battery charger 10 via the first 12 and second 14 charging contacts. If a plurality of batteries 18 is to be charged, additional contacts (not shown) may be provided, or the batteries 18 may be coupled to one another in series for connection the first 12 and second 14 charging contacts. In addition, the first 12 and second 14 charging contacts may be configured according to a specific application of the impulse battery charger 10. For example, the first 12 and second 14 charging contacts may comprise spring metal and be configured to receive charging terminals 16 of a battery 18 that has been removed from a device (not shown). In another example, wherein the battery 18 remains inside a device during a charging cycle, the first 12 and second 14 charging contacts may be configured as part of a charging cable. In yet another example, the battery 18 may remain within a device, such as a vehicle, backup power system, or the like, and the impulse battery charger 10 may be installed within the device, either temporarily or permanently.

Figure 2:
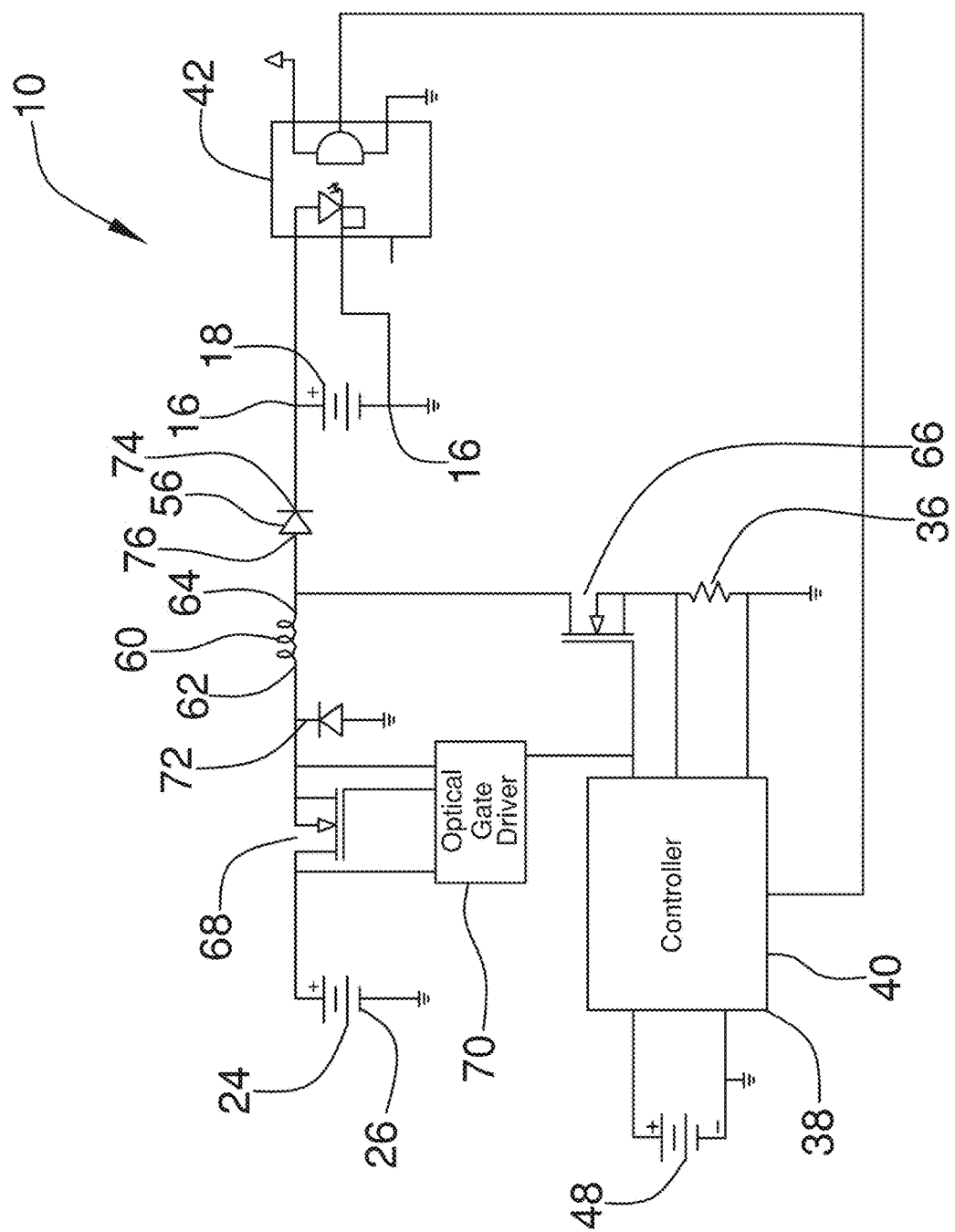
FIG. 2 is a circuit diagram embodiment of the disclosure.
Figure 3:
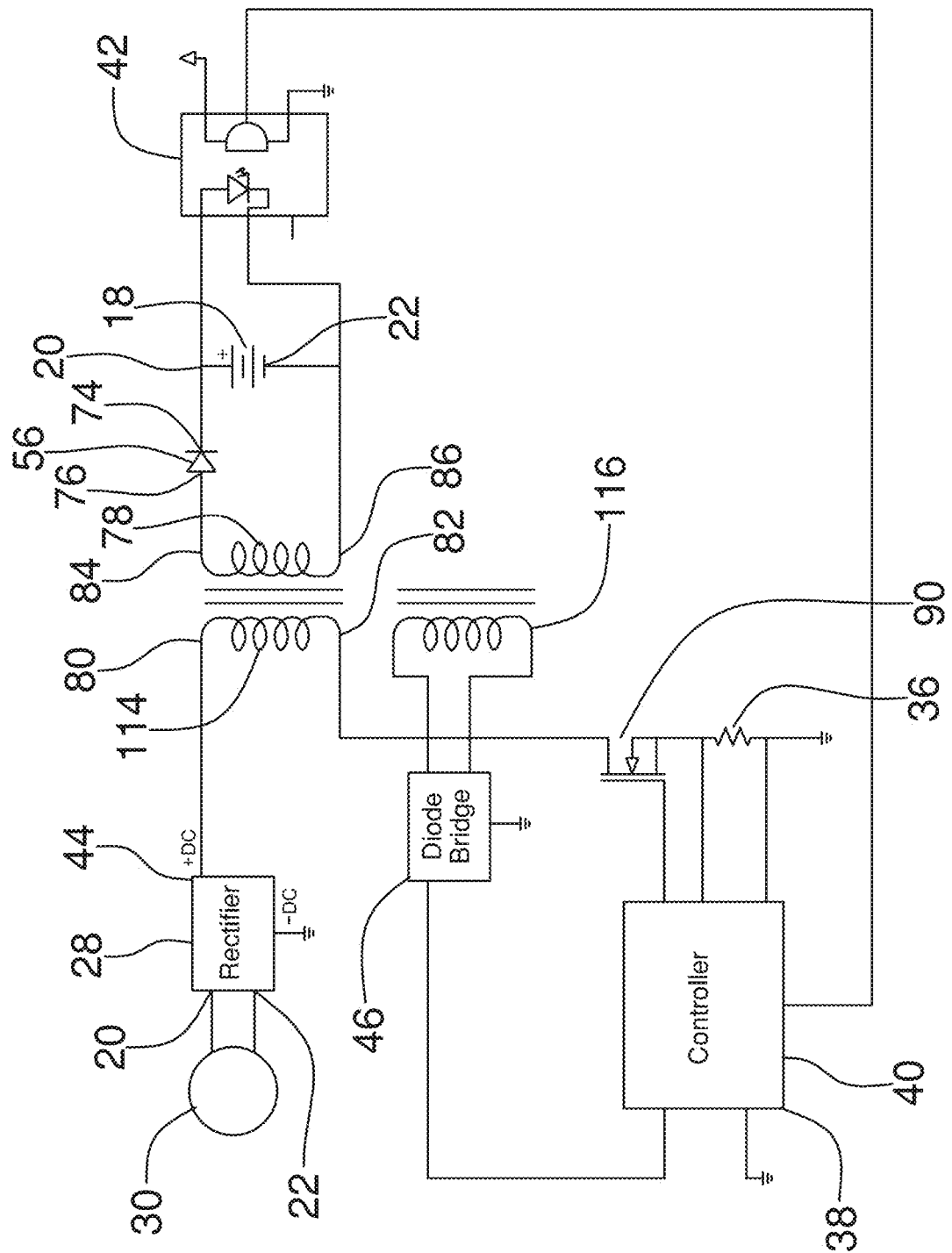
FIG. 3 is circuit diagram of an embodiment of the disclosure.
Figure 4:
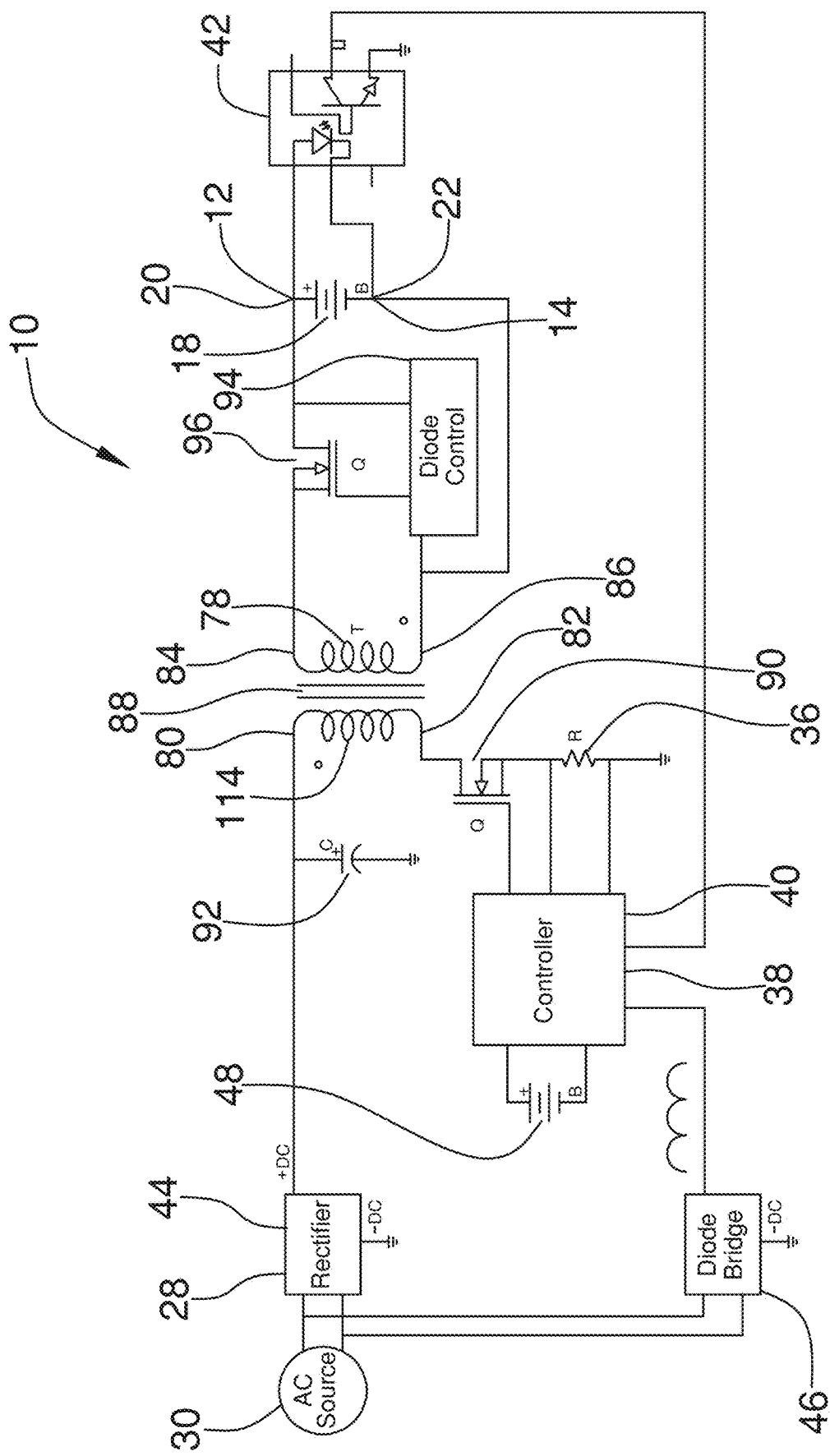
FIG. 4 is circuit diagram of an embodiment of the disclosure.

A first terminal 20 and a second terminal 22 are configured to electrically connect to a source of direct current (SDC) 24, which may comprise a dry cell 26, as is shown in FIG. 2 and which may be integral to the impulse battery charger 10, a solar panel (not shown), a vehicle alternator (not shown), or the like. The first 20 and second 22 terminals also may be integral to a bridge rectifier 28, as is shown in FIGS. 3 and 4. The bridge rectifier 28 thus is configured for electrical connection to a source of alternating current 30, such as an outlet (not shown), and to convert alternating current to direct current, thus serving as the SDC 24.

A switching module 32 is operationally engaged to the inductor 34 and enables selective engagement of the inductor 34 with the battery 18 and selective isolation of the inductor 34 from the SDC 24. A current sensor 36 is configured to measure current flowing between the inductor 34 and the first 20 and second 22 terminals. Such current sensors 36 are well known in the prior art and may be of a variety of configurations, all of which are anticipated by the present invention.

A controller 38 is operationally engaged to the current sensor 36 and the switching module 32 to alternate the switching module 32 between a first configuration and a second configuration in response to a signal from the current sensor 36 indicating that the current between the inductor 34 and the first 20 and second 22 terminals exceeds a predetermined threshold value. The controller 38 may be an application-specific integrated circuit or may comprise a more complex type of control module, processor, or the like. The controller 38 typically would comprise a timer 40 and be configured to place the switching module 32, upon expiration of the timer 40, in the first configuration.

The inductor 34 is connected to the and the first 20 and second 22 terminals in the first configuration, thereby allowing the SDC 24 to magnetically energize the inductor 34. The inductor 34 is isolated from the SDC 24 and is engaged to the battery 18 in the second configuration, thereby enabling magnetic energy that is stored in the inductor 34 to pass as direct current to the battery 18 to charge the battery 18. A current between the inductor 34 and the battery 18, which is induced by placement of the switching module 32 in the second configuration, rises from 0 Amperes to a maximum value at a first average rate and declines from the maximum value to 0 Amperes at a second average rate that is lower than the first average rate.

A voltage sensor 42 typically is connected across the first 12 and second 14 charging contact to measure a voltage of the battery 18. The controller 38 thus is enabled to turn off the impulse battery charger 10 when the voltage measured exceeds a predetermined value. Such voltage sensors 42 are well known in the prior art and may be of a variety of configurations, all of which are anticipated by the present invention. In some embodiments, the voltage sensor 42 may be integral to a device in which the battery 18 is deployed and may relay voltage readings to the impulse battery charger 10 via one or more contacts, data connections, or the like. Charge level status may also be made available to a user during charging operations, such as through a mobile phone display (not shown) or the like.

The bridge rectifier 28 may comprise a first diode bridge 44, as is shown in FIGS. 3 and 4, with a second diode bridge 46 being conductively connected to the controller 38 and configured for electrical connection to the source of alternating current 30. The controller 38 thus can be independently powered via the second diode bridge 46, although the present invention also anticipates the controller 38 being independently powered by a dedicated dry cell 48, as is shown in FIGS. 1 and 2. The second diode bridge 46 is configured for full wave rectification of the alternating current, voltage reduction, and to send a power factor correction signal to the controller 38. The controller 38 thus is enabled to modulate a draw of alternating current that is proportional to the alternating current voltage to effectively mimic a pure resistive load.

The inductor 34 has a first end 50 and a second end 52. A current limiter 54, which is conductively connected to the second end 52 of the inductor 34 and the first charging contact 12, is configured to prevent current flow from the first charging contact 12 toward the second end 52 of the inductor 34. The current limiter 54 typically will comprise either a rectifier diode 56 or an ideal diode circuit 58. As a rectifier diode 56 can induce a voltage drop close to 1V, which represents a major power loss at high currents, such as 100 A, minimizing voltage drop through use of the ideal diode circuit 58 is advantageous as it can reduce power loss by up to 90%.

Figure 5:
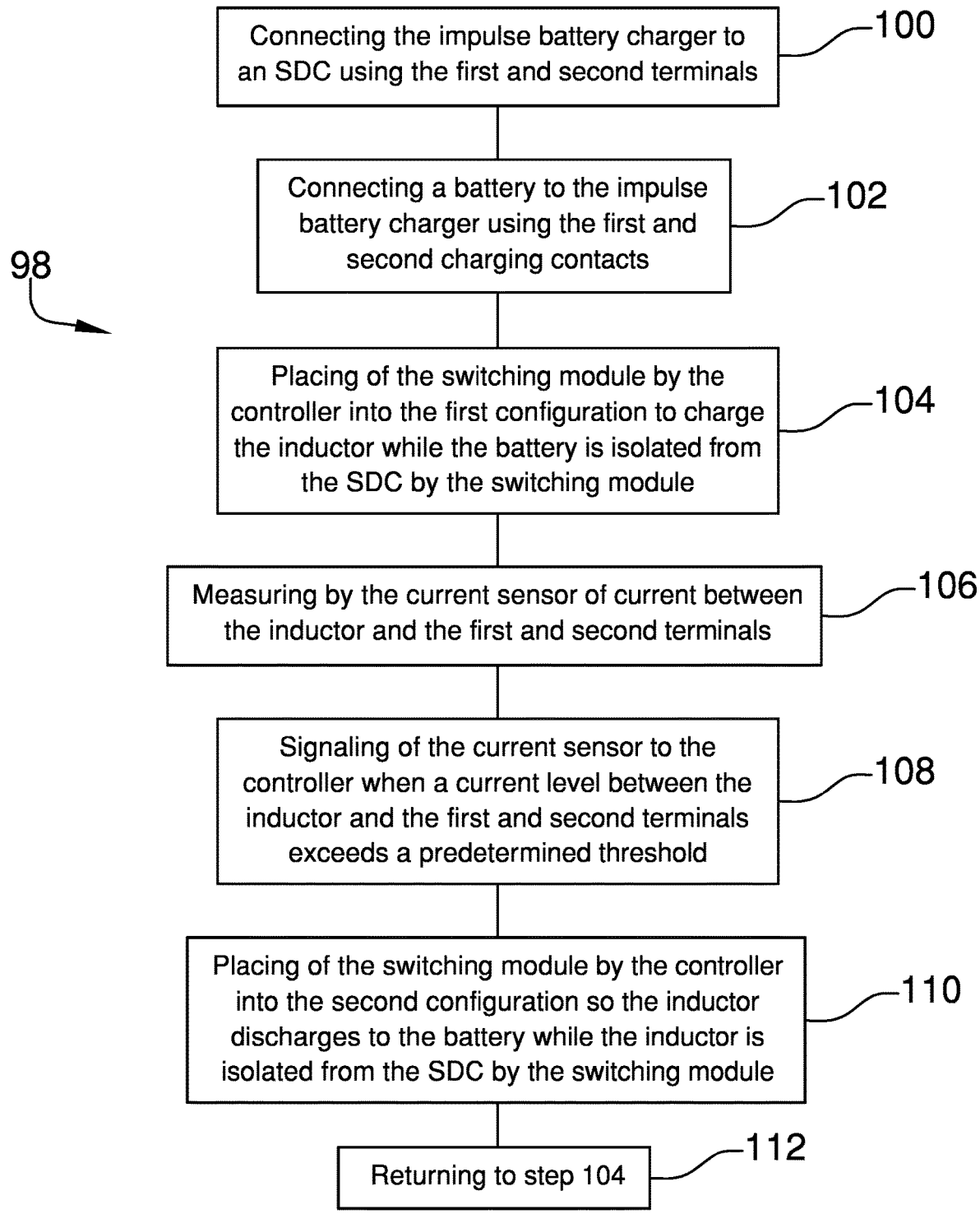
FIG. 5 is a flow diagram for a method of charging a battery utilizing an embodiment of the disclosure.
Figure 6:
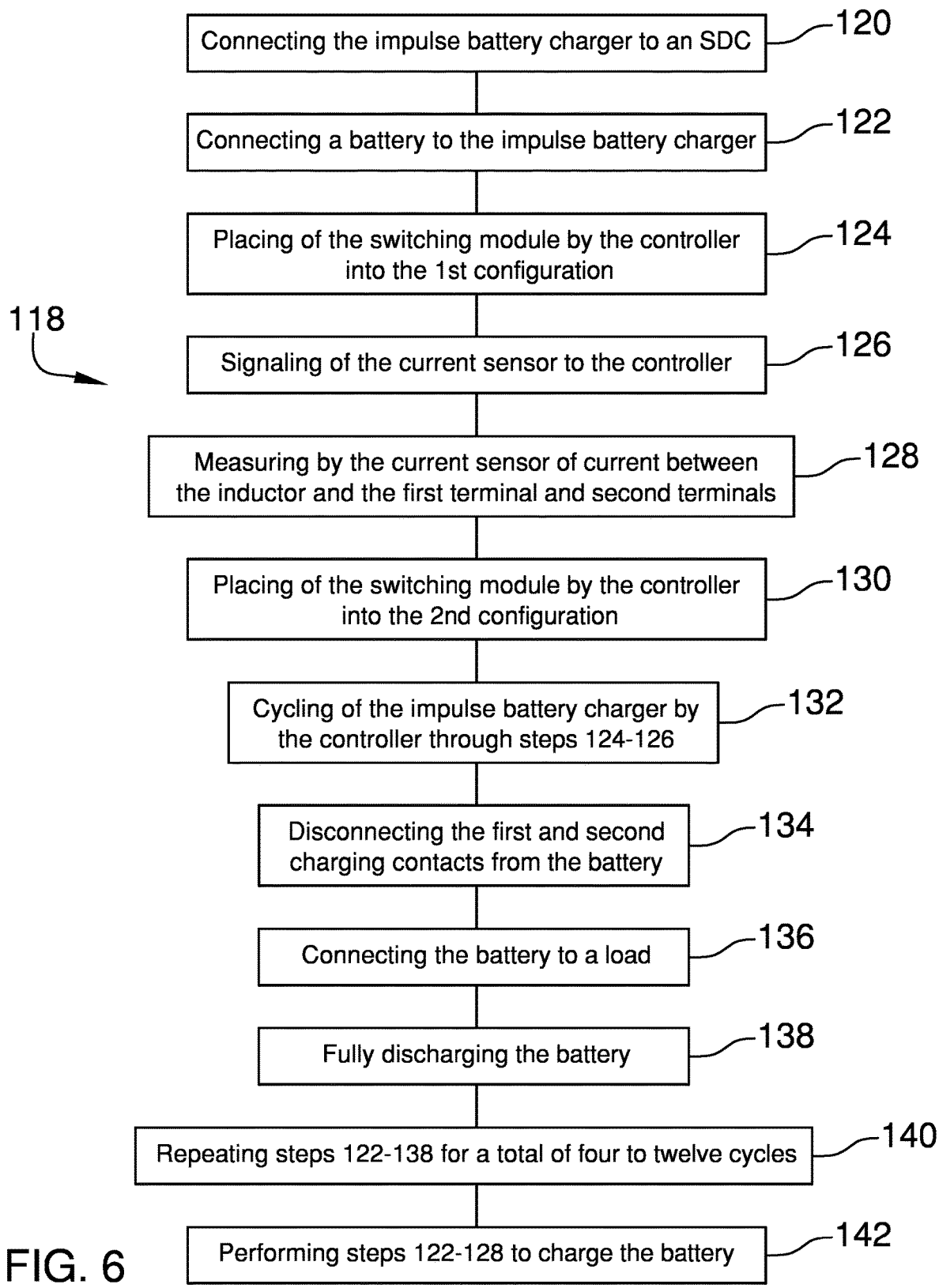
FIG. 6 is a flow diagram for a method of conditioning a battery utilizing an embodiment of the disclosure.

Operation of the impulse battery charger 10 in FIG. 1 can be explained with reference to the flow chart of FIG. 5, which preferably is executed by the controller 38. Initially, the switching module 32 is placed in the first configuration to start the charging process, allowing current to flow from the SDC 24 into the inductor 34. The switching module 32 and the current limiter 54 prevent any current from SDC 24 from flowing through the battery 18. The controller 38 checks whether a current level measured by the current sensor 36 exceeds a predetermined threshold, which generally would be indicative of a desired current level in the inductor 34. The desired current level is preferably predetermined and may be based on the properties of the battery 18. For example, for a 1 A rated battery 18, the desired current level may be set to 1 A. However, adjustments could be made to raise or lower the current level based on other factors of the impulse battery charger 10 or the battery 18. In embodiments allowing adjustments, such adjustments may be made manually and/or automatically and would be based on sensor feedback to the controller 38 indicating properties of the battery 18.

If the current level does not exceed the predetermined threshold, the controller 38 continues to monitor the current level. When the current level exceeds the predetermined threshold, the controller 38 places the switching module 32 in the second configuration, wherein the SDC 24 is disconnected from the inductor 34, which then transfers its energy to the battery 18 through the current limiter 54. The inductor 34 generally would completely discharge to the battery 18, that is, the current from the inductor 34 would go to zero before the cycle repeats. The controller 38 determines whether an event to trigger a switch from the second configuration back to the first configuration has occurred, which may be expiration of a known time for the inductor 34 to discharge to 0 A, although additional delay may also be built in to allow for tolerance or other operational advantages. In other embodiments, an additional current sensor (not shown) may be arranged to determine the current level in the inductor 34 and to signal the controller 38 to place the switching module 32 in the first configuration. The process above repeats until the battery 18 is charged.

In the embodiments shown in FIGS. 1-4, a voltage of the battery 18 is detected by the voltage sensor 42, which relays a voltage reading back to the controller 38. In operation, the controller 38 can make adjustments as necessary as the battery 18 is charging, such as reducing the current level in the inductor 34 as the battery 18 nears full charge, supplying power as long as the battery 18 continues to absorb energy, shutting off the impulse battery charger 10 upon the battery 18 reaching and maintaining full charge, or the like.

Additionally, the impulse battery charger 10 can be operated so as to condition a battery 18 to increase its charge capacity, which is readily measurable, and efficiency, as determined by lower operating temperatures of both the battery 18 and a load (not shown) attached to the battery 18 during discharge. Conditioning a battery 18 entails the charging the battery 18, as above, fully discharging the battery, and repeating the process four to twelve times. Typically, the charging and discharging of the battery 18 will be repeated six times and ideally will be performed before first use of the battery 18 and at regular intervals over a lifetime of the battery 18. The lower operating temperature of the load may be due in part to reduced heat transfer through connecting cables between the battery 18 and the load and to other, yet undetermined, phenomena.

In the embodiment shown in FIG. 2, the inductor 34 comprises an induction coil 60 having a first end 62 and a second end 64. The induction coil 60 may be a toroidal type induction coil, or other type of air-core or iron-core inductor. The inductance of the induction coil 60 is preferably fixed and may be selected based on the properties of the battery 18 to be charged. In a number of embodiments, an induction coil 60 having an inductance of about 1 μH is sufficient, although induction coils 60 having inductances at least as high as 250 μH have been shown to be viable.

In this embodiment, the switching module 32 comprises a first transistor 66, a second transistor 68, an optical gate driver 70, a grounded diode 72, and a rectifier diode 56. The first transistor 66 is conductively connected to the second end 64 of the induction coil 60 and to the second terminal 22. The first transistor 66 may comprise a metal-oxide-semiconductor field-effect transistor (MOSFET), other type of transistor having its drain side connected to the second end 64 of the induction coil 60 and its source side connected to the second terminal 22, or other mechanical or MEMS-type switching means.

The optical gate driver 70 is conductively connected to the first end 62 of the induction coil 60 and to the first 20 second 22 terminal. The grounded diode 72 is conductively connected to the optical gate driver 70 and the first end 62 of the induction coil 60. The rectifier diode 56 has a cathode 74 and an anode 76, which are conductively connected to the first charging contact 12 and to the second end 64 of the induction coil 60, respectively, to prevent current flow from the first charging contact 12 toward the second end 64 of the induction coil 60.

The second transistor 68 is conductively connected to the optical gate driver 70 and to the first terminal 20. In the first configuration, the first 66 and second 68 transistors are "on" and the grounded 72 and rectifier 56 diodes are "off" so that the induction coil 60 is connected to the first 20 and second 22 terminals, thereby allowing the SDC 24 to magnetically energize the induction coil 60. In the second configuration, the first 66 and second 68 transistors are "off" and the grounded 72 and rectifier 56 diodes are "on" so that the induction coil 60 is disconnected from the first 20 and second 22 terminals and is connected across the first 12 and the second 14 charging contacts, thereby enabling magnetic energy stored in the induction coil 60 to discharge to the battery 18.

As described above for the general embodiment, the controller 38 typically would comprise a timer 40 and be configured to place the switching module 32, upon expiration of the timer 40, in the first configuration. The timer 40 typically is set to at least a known period of time required for the induction coil 60 to discharge to 0 Amperes. A current between the induction coil 60 and the battery 18, which is induced by placement of the switching module 32 in the second configuration, rises from 0 Amperes to a maximum value at a first average rate and declines from the maximum value to 0 Amperes at a second average rate that is lower than the first average rate. A voltage sensor 42 typically is connected across the first 12 and the second 14 charging contacts to measure a voltage of the battery 18. The controller 38 thus is enabled to turn off the impulse battery charger when the voltage measured exceeds a predetermined value. The controller 38 alternates the switching module 32 between the first and second configurations at a rate of between 1 and 1,000,000 times per second.

Also as described above for the general embodiment, the first 20 and second 22 terminals may be integral to a bridge rectifier 28, which is configured for electrical connection to a source of alternating current 30 and to convert alternating current to direct current.

In the embodiment shown in FIG. 4, the inductor 34 comprises a charge coil 114 having a first end 80 and a second end 82. A discharge coil 78 is physically separated from and magnetically coupled to the charge coil 114. The discharge coil 78 has a first endpoint 84 and a second endpoint 86, which are conductively connected with the first 12 and second 14 charging contacts, respectively. The charge coil 114 and the discharge coil 78 together may comprise a flyback transformer 88. The switching module 32 of this embodiment comprises a transistor 90, which is conductively connected to the second end 82 of the charge coil 114 and to the second terminal 22.

As for the first transistor 66 described above, the transistor 90 of this embodiment may comprise a metal-oxide-semiconductor field-effect transistor (MOSFET), other type of transistor having its drain side connected to the second end 82 of the charge coil 114 and its source side connected to the second terminal 22, or other mechanical or MEMS-type switching means. A grounded capacitor 92, which is conductively connected to the first end 80 of the charge coil 114 and the first terminal 20, is configured to smooth the direct current from the SDC 24.

The current limiter 54 of this embodiment is conductively connected to the discharge coil 78 and the first charging contact 12 and is configured to prevent current flow from the first charging contact 12 toward first endpoint 84 of the discharge coil 78. In the first configuration, the transistor 90 is "on" and the current limiter 54 is "off" so that the charge coil 114 is connected to the first 20 and second 22 terminals, thereby allowing the SDC 24 to magnetically energize the charge coil 114. In the second configuration, the transistor 90 is "off" and the current limiter 54 is "on" so that the charge coil 114 is disconnected from the first 20 and second 22 terminals and so that the discharge coil 78 is connected across the first 12 and second 14 charging contacts. Thus, magnetic energy that is stored in the charge coil 114 transfers to the discharge coil 78 and then to the battery 18.

As is shown in FIG. 4, the current limiter 54 comprises an ideal diode circuit 58, which in turn comprises an ideal diode control module 94 and a metal-oxide-semiconductor field-effect transistor (MOSFET) 96. The ideal diode control module 94 is conductively connected to the first endpoint 84 of the discharge coil 78 and the second charging contact 14. The MOSFET 96 is conductively connected to the first endpoint 84 of the discharge coil 78 and the first charging contact 12. The current limiter 54 also may comprise a rectifier diode 56, having a cathode 74 and an anode 76, with the former being connected to the first charging contact 12 and the latter being connected to the first endpoint 84 of the discharge coil 78.

As described above for the general embodiment, the controller 38 typically would comprise a timer 40 and be configured to place the switching module 32, upon expiration of the timer 40, in the first configuration. The timer 40 typically is set to at least a known period of time required for the induction coil 60 to discharge to 0 Amperes. A current between the discharge coil 78 and the battery 18, which is induced by placement of the switching module 32 in the second configuration, rises from 0 Amperes to a maximum value at a first average rate and declines from the maximum value to 0 Amperes at a second average rate that is lower than the first average rate. A voltage sensor 42 typically is connected across the first 12 and second 14 charging contacts to measure a voltage of the battery 18. The controller 38 thus is enabled to turn off the impulse battery charger 10 when the voltage measured exceeds a predetermined value. The controller 38 alternates the switching module 32 between the first and second configurations at a rate of between 1 and 1,000,000 times per second.

As described above for the general embodiment, the first 20 and second 22 terminals may be integral to a first diode bridge 44, which thus is configured for electrical connection to a source of alternating current 30 and to convert alternating current to direct current. A second diode bridge 46 is conductively connected to the controller 38 and is configured for electrical connection to the source of alternating current 30, thus providing for full wave rectification of the alternating current, voltage reduction and sending of a power factor correction signal to the controller 38 enabling the controller 38 to modulate a draw of alternating current proportional to the alternating current voltage to mimic a pure resistive load. As is shown in FIG. 2, a secondary winding 116 of the flyback transformer 88 may supply current to the second bridge diode 46.

In use, the impulse battery charger 10 enables a method of charging a battery 98 entailing provision of an impulse battery charger 10, according to the specification above. A first step 100 of the charging method 98 is connecting the impulse battery charger 10 to an SDC 24 using the first 20 and second 22 terminal. A second step 102 of the charging method 98 is connecting a battery 18 to the impulse battery charger 10 using the first 12 and second 14 charging contacts. A third step 104 of the charging method 98 is placing of the switching module 32, by the controller 38, into the first configuration to charge the inductor 34 while the battery 18 is isolated from the SDC 24 by the switching module 32. A fourth step 106 of the charging method 98 is measuring, by the current sensor 36, of current between the inductor 34 and the first 20 and second 22 terminals. A fifth step 108 of the charging method 98 is signaling of the current sensor 36 to the controller 38 when a current level between the inductor 34 and the first 20 and second 22 terminals exceeds a predetermined threshold. A sixth step 110 of the charging method 98 is placing of the switching module 32, again by the controller 38, into the second configuration so that the inductor 34 discharges to the battery 18 while the inductor 34 is isolated from the SDC 24 by the switching module 32. A seventh step 112 of the charging method 98 is returning to the first step 100.

With the impulse battery charger 10 further including a voltage sensor 42 connected across the first 12 and second 14 charging, the controller 38 can be programmed to cycle the impulse battery charger 10 through steps (c) to (f) until the voltage measured reaches a voltage specification for the battery 18, to decrease power in subsequent cycling through steps (c) to (f) so as not to exceed the voltage specification, and to turn off the impulse battery charger 10 when the battery 18 stops absorbing power.

The impulse battery charger 10 also enables a method of conditioning a battery using an impulse battery charger 118, which entails provision of the impulse battery charger 10 inclusive of a voltage sensor 42. A first step 120 of the conditioning method is connecting the impulse battery charger to an SDC 24 using the first 20 and second 22 terminals. A second step 122 of the conditioning method 118 is connecting a battery 18 to the impulse battery charger 10 using the first 12 and second 14 charging contacts. A third step 124 of the conditioning method 118 is placing of the switching module 32 by the controller 38 into the first configuration to charge the inductor 34 while the battery 18 is isolated from the SDC 24 by the switching module 32. A fourth step 126 of the conditioning method 118 is measuring by the current sensor 36 of current between the inductor 34 and the first 20 and second 22 terminals. A fifth step 128 of the conditioning method 118 is signaling of the current sensor 36 to the controller 38 when a current level between the inductor 34 and the first 20 and second 22 terminals exceeds a predetermined threshold. A sixth step 130 of the conditioning method 118 is placing of the switching module 32 by the controller 38 into the second configuration such that the inductor 34 discharges to the battery 18 while the inductor 34 is isolated from the SDC 24 by the switching module 32. A seventh step 132 of the conditioning method 118 is cycling of the impulse battery charger 10 by the controller 38 through steps 3 to 6 until the voltage measured reaches a voltage specification for the battery 18.

An eighth step 134 of the conditioning method 118 is disconnecting the first 12 and second 14 charging contacts from the battery 18. A ninth step 136 of the conditioning method 118 is connecting the battery 18 to a load. A tenth step 138 of the conditioning method 118 is fully discharging the battery 18. An eleventh step 140 of the conditioning method 118 is repeating steps 2 to 10 for a total of four to twelve cycles to condition the battery 18. Typically, steps 2 to 10 will be repeated for six cycles. A twelfth step 142 of the conditioning method 118 is performing steps (b) to (g) to charge the battery 18.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An impulse battery charger comprising:
   a first charging contact and a second charging contact each being configured for receiving a respective charging terminal of a battery to be charged;
   a first terminal and a second terminal being configured for electrically connecting to a source of direct current (SDC);
   an inductor having a first end and a second end;
   a switching module operationally engaged to the inductor enabling selective engagement of the inductor with the battery and selective isolation of the inductor from the SDC;
   a current sensor configured to measure current flowing between the inductor, the first terminal, and second terminal; and
   a controller being operationally engaged to the current sensor and the switching module for alternating the switching module between a first configuration and a second configuration in response to a signal from the current sensor indicating that the current between the inductor, the first terminal, and second terminal exceeds a predetermined threshold value, where, in the first configuration, the inductor is connected to the first terminal and the second terminal allowing the SDC to magnetically energize the inductor, and where, in the second configuration, the inductor is isolated from the SDC and is engaged to the battery enabling magnetic energy stored in the inductor to pass as direct current to the battery for charging the battery.

2. The impulse battery charger of claim 1, wherein the controller comprises a timer and is configured for placing the switching module, upon expiration of the timer, in the first configuration.

3. The impulse battery charger of claim 1, further including a voltage sensor connected across the first charging contact and second charging contact for measuring a voltage of the battery thereby enabling the controller, when the voltage measured exceeds a predetermined value, to turn off the impulse battery charger.

4. The impulse battery charger of claim 1, wherein a current between the inductor and the battery induced by placement of the switching module in the second configuration rises from 0 Amperes to a maximum value at a first average rate and declines from the maximum value to 0 Amperes at a second average rate that is lower than the first average rate.

5. The impulse battery charger of claim 1, further including a bridge rectifier, the first terminal and the second terminal being integral to the bridge rectifier such that the bridge rectifier is configured for electrical connection to a source of alternating current and for converting alternating current to direct current.

6. The impulse battery charger of claim 5, further including:
the bridge rectifier comprising a first diode bridge; and
a second diode bridge being conductively connected to the controller and being configured for electrical connection to the source of alternating current, the second diode bridge being configured for full wave rectification of the alternating current, voltage reduction, and sending a power factor correction signal to the controller enabling the controller to modulate a draw of alternating current proportional to the alternating current voltage for mimicking a pure resistive load.

7. The impulse battery charger of claim 1, further including a current limiter conductively connected to the second end of the inductor and the first charging contact, the current limiter being configured to prevent current flow from the first charging contact toward the second end of the inductor.

8. The impulse battery charger of claim 7, wherein the current limiter comprises a rectifier diode or an ideal diode circuit.

9. The impulse battery charger of claim 1, further including:
the inductor comprising an induction coil having a first end and a second end;
the switching module comprising:
a first transistor being conductively connected to the second end of the induction coil and the second terminal;
an optical gate driver being conductively connected to the first end of the induction coil, the first terminal, and second terminal;
a grounded diode being conductively connected to the optical gate driver and the first end of the induction coil;
a rectifier diode having a cathode and an anode, the cathode being conductively connected to the first charging contact and the anode being conductively connected to the second end of the induction coil for preventing current flow from the first charging contact toward the second end of the induction coil; and
a second transistor being conductively connected to the optical gate driver and the first terminal; and
where, in the first configuration the first transistor and the second transistor are on and the grounded diode and the rectifier diode are off such that the induction coil is connected to the first terminal and the second terminal allowing the SDC to magnetically energize the induction coil and where, in the second configuration, the first transistor and the second transistor are off and the grounded diode and the rectifier diode are on such that the induction coil is disconnected from the first terminal and the second terminal and is connected across the first charging contact and the second charging contact, thereby enabling magnetic energy stored in the induction coil to discharge to the battery.

10. The impulse battery charger of claim 9, wherein the induction coil is a toroidal type induction coil.

11. The impulse battery charger of claim 9, further including:
the induction coil being a toroidal type induction coil;
the controller comprising a timer and being configured for placing the switching module, upon expiration of the timer, in the first configuration;
a voltage sensor being connected across the first charging contact and the second charging contact for measuring a voltage of the battery thereby enabling the controller, when the voltage measured exceeds a predetermined value, to turn off the impulse battery charger;
a current between the induction coil and the battery induced by placement of the switching module in the second configuration rising from 0 Amperes to a maximum value at a first average rate and declining from the maximum value to 0 Amperes at a second average rate that is lower than the first average rate; and
the first terminal and the second terminal being integral to a bridge rectifier, the bridge rectifier being configured for electrical connection to a source of alternating current and for converting alternating current to direct current.

12. The impulse battery charger of claim 1, further including:
the inductor comprising a charge coil having a first end and a second end;
a discharge coil being physically separated from and magnetically coupled to the charge coil, the discharge coil having a first endpoint and a second endpoint, the first endpoint and the second endpoint being conductively connected with the first charging contact and the second charging contact, respectively;
the switching module comprising:
a transistor being conductively connected to the second end of the charge coil and the second terminal;
a grounded capacitor being conductively connected to the first end of the charge coil and the first terminal, the grounded capacitor being configured for smoothing the direct current from the SDC; and
a current limiter being conductively connected to the discharge coil and the first charging contact, the current limiter being configured to prevent current flow from the first charging contact toward first endpoint of the discharge coil; and where, in the first configuration the transistor is on and the current limiter is off such that the charge coil is connected to the first terminal and the second terminal allowing the SDC to magnetically energize the charge coil and where, in the second configuration the transistor is off and the current limiter is on such that the charge coil is disconnected from the first terminal and the second terminal and such that the discharge coil is connected across the first charging contact and the second charging contact, thereby enabling magnetic energy stored in the charge coil to transfer to the discharge coil and then to the battery.

13. The impulse battery charger of claim 12, wherein the charge coil and the discharge coil together comprise a flyback transformer.

14. The impulse battery charger of claim 12, wherein the current limiter comprises an ideal diode circuit, the ideal diode circuit comprising:
an ideal diode control module being conductively connected to the first endpoint of the discharge coil and the second charging contact; and
a metal-oxide-semiconductor field-effect transistor (MOSFET) being conductively connected to the first endpoint of the discharge coil and the first charging contact.

15. The impulse battery charger of claim 12, wherein the current limiter comprises a rectifier diode having a cathode and an anode, the cathode being connected to the first charging contact and the anode being connected to the first endpoint of the discharge coil.

16. The impulse battery charger of claim 12, further including:
the charge coil and the discharge coil together comprise a flyback transformer;
the controller comprising a timer and being configured for placing the switching module, upon expiration of the timer, in the first configuration;
a voltage sensor connected across the first charging contact and second charging contact for measuring a voltage of the battery thereby enabling the controller, when the voltage measured exceeds a predetermined value, to turn off the impulse battery charger;
a current between the discharge coil and the battery induced by placement of the switching module in the second configuration rising from 0 Amperes to a maximum value at a first average rate and declining from the maximum value to 0 Amperes at a second average rate that is lower than the first average rate;
a first diode bridge, the first terminal and the second terminal being integral to the first diode bridge such that the first diode bridge is configured for electrical connection to a source of alternating current and for converting alternating current to direct current;
a second diode bridge being conductively connected to the controller and being configured for electrical connection to the source of alternating current, the second diode bridge being configured for full wave rectification of the alternating current, voltage reduction, and sending a power factor correction signal to the controller enabling the controller to modulate a draw of alternating current proportional to the alternating current voltage for mimicking a pure resistive load; and
the current limiter comprising an ideal diode circuit, the ideal diode circuit comprising:
an ideal diode control module being conductively connected to the first endpoint of the discharge coil and the second charging contact; and
a metal-oxide-semiconductor field-effect transistor (MOSFET) being conductively connected to the first endpoint of the discharge coil and the first charging contact.

17. A method of charging a battery using an impulse battery charger, the method comprising steps of:
providing an impulse battery charger including
a first charging contact and a second charging contact each being configured for receiving a respective charging terminal of a battery to be charged;
a first terminal and a second terminal being configured for electrically connecting to a source of direct current (SDC);
an inductor having a first end and a second end;
a switching module operationally engaged to the inductor enabling selective engagement of the inductor with the battery and selective isolation of the inductor from the SDC;
a current sensor configured to measure current flowing between the inductor, the first terminal, and second terminal; and
a controller being operationally engaged to the current sensor and the switching module for alternating the switching module between a first configuration and a second configuration in response to a signal from the current sensor indicating that the current between the inductor, the first terminal, and second terminal exceeds a predetermined threshold value, where, in the first configuration, the inductor is connected to the first terminal and the second terminal allowing the SDC to magnetically energize the inductor, and where, in the second configuration, the inductor is isolated from the SDC and is engaged to the battery enabling magnetic energy stored in the inductor to pass as direct current to the battery for charging the battery
(a) connecting the impulse battery charger to an SDC using the first terminal and the second terminal;
(b) connecting a battery to the impulse battery charger using the first charging contact and the second charging contact;
(c) placing of the switching module by the controller into the first configuration to charge the inductor while the battery is isolated from the SDC by the switching module;
(d) measuring by the current sensor of current between the inductor, the first terminal, and the second terminal;
(e) signaling of the current sensor to the controller when a current level between the inductor, the first terminal and the second terminal exceeds a predetermined threshold;
(f) placing of the switching module by the controller into the second configuration such that the inductor discharges to the battery while the inductor is isolated from the SDC by the switching module; and
(h) returning to step (c).

18. The method of charging a battery of claim 17, further including:
the impulse battery charger further including a voltage sensor, the voltage sensor being connected across the first charging contact and the second charging contact for measuring a voltage of the battery;
the controller being programmed to cycle the impulse battery charger through steps (c) to (f) until the voltage measured reaches a voltage specification for the battery, to decrease power in subsequent cycling through steps (c) to (f) so as not to exceed the voltage specification, and to turn off the impulse battery charger when the battery stops absorbing power.

19. The method of charging a battery of claim 17, further including:
the inductor of the impulse battery charger comprising an induction coil having a first end and a second end;
the switching module of the impulse battery charger comprising:
a first transistor being conductively connected to the second end of the induction coil and the second terminal;
an optical gate driver being conductively connected to the first end of the inductor, the first terminal, and second terminal;
a grounded diode being conductively connected to the optical gate driver and the first end of the induction coil;
a rectifier diode having a cathode and an anode, the cathode being conductively connected to the first charging contact and the anode being conductively connected to the second end of the induction coil for preventing current flow from the first charging contact toward the second end of the induction coil; and
a second transistor being conductively connected to the optical gate driver and the first terminal, where, in the first configuration the first transistor and the second transistor are on and the grounded diode and the rectifier diode are off such that the induction coil is connected to the first terminal and the second terminal allowing the SDC to magnetically energize the induction coil and where, in the second configuration, the first transistor and the second transistor are off and the grounded diode and the rectifier diode are on such that the induction coil is disconnected from the first terminal and the second terminal and is connected across the first charging contact and the second charging contact, thereby enabling magnetic energy stored in the induction coil to discharge to the battery;
the controller comprising a timer and being configured for placing the switching module, upon expiration of the timer, in the first configuration to return to step (a); and
the impulse battery charger further including a voltage sensor, the voltage sensor being connected across the first charging contact and the second charging contact for measuring a voltage of the battery thereby enabling the controller, when the voltage measured exceeds a predetermined value, to turn off the impulse battery charger.

20. The method of charging a battery of claim 17, further including:
the inductor of the impulse battery charger comprising a charge coil having a first end and a second end;
the impulse battery charger further comprising a discharge coil being physically separated from and magnetically coupled to the charge coil, the discharge coil having a first endpoint and a second endpoint, the first endpoint and the second endpoint being conductively connected with the first charging contact and the second charging contact, respectively;
the switching module of the impulse battery charger comprising:
a transistor being conductively connected to the second end of the charge coil and the second terminal;
a grounded capacitor being conductively connected to the first end of the charge coil and the first terminal, the grounded capacitor being configured for smoothing the direct current from the SDC;
a current limiter being conductively connected to the discharge coil and the first charging contact, the current limiter being configured to prevent current flow from the first charging contact toward first endpoint of the discharge coil, where, in the first configuration the transistor is on and the current limiter is off such that the charge coil is connected to the first terminal and the second terminal allowing the SDC to magnetically energize the charge coil and where, in the second configuration the transistor is off and the current limiter is on such that the charge coil is disconnected from the first terminal and the second terminal and such that the discharge coil is connected across the first charging contact and the second charging contact, thereby enabling magnetic energy stored in the charge coil to transfer to the discharge coil and then to the battery;
the controller of the impulse battery charger comprising a timer and being configured for placing the switching module, upon expiration of the timer, in the first configuration;
a voltage sensor connected across the first charging contact and second charging contact for measuring a voltage of the battery thereby enabling the controller, when the voltage measured exceeds a predetermined value, to turn off the impulse battery charger;
a first diode bridge, the first terminal and the second terminal being integral to the first diode bridge such that the first diode bridge is configured for electrical connection to a source of alternating current and for converting alternating current to direct current;
a second diode bridge being conductively connected to the controller and being configured for electrical connection to the source of alternating current, the second diode bridge being configured for full wave rectification of the alternating current, voltage reduction, and sending a power factor correction signal to the controller enabling the controller to modulate a draw of alternating current proportional to the alternating current voltage for mimicking a pure resistive load; and
the current limiter comprising an ideal diode circuit, the ideal diode circuit comprising:
an ideal diode control module being conductively connected to the first endpoint of the discharge coil and the second charging contact; and
a metal-oxide-semiconductor field-effect transistor (MOSFET) being conductively connected to the first endpoint of the discharge coil and the first charging contact.

21. The method of charging a battery of claim 17, further including:
the controller of the impulse battery charger comprising a timer and being configured for placing the switching module, upon expiration of the timer, in the first configuration;
a current between the inductor and the battery induced by placement of the switching module in the second configuration rising from 0 Amperes to a maximum value at a first average rate and declining from the maximum value to 0 Amperes at a second average rate that is lower than the first average rate;
the controller alternating the switching module between the first configuration and the second configuration at a rate of between 1 and 1,000,000 times per second; and the timer being set to at least a known period of time required for the inductor to discharge to 0 Amperes.

22. A method of conditioning a battery using an impulse battery charger, the method comprising providing the impulse battery charger of claim 3, and:
- (a) connecting the impulse battery charger to an SDC using the first terminal and the second terminal;
- (b) connecting a battery to the impulse battery charger using the first charging contact and the second charging contact;
- (c) placing of the switching module by the controller into the first configuration to charge the inductor while the battery is isolated from the SDC by the switching module;
- (d) measuring by the current sensor of current between the inductor, the first terminal, and the second terminal;
- (e) signaling of the current sensor to the controller when a current level between the inductor, the first terminal and the second terminal exceeds a predetermined threshold;
- (f) placing of the switching module by the controller into the second configuration such that the inductor discharges to the battery while the inductor is isolated from the SDC by the switching module;
- (g) cycling of the impulse battery charger by the controller through steps (c) to (f) until the voltage measured reaches a voltage specification for the battery;
- (h) disconnecting the first charging contact and the second charging contact from the battery;
- (i) connecting the battery to a load;
- (j) fully discharging the battery;
- (k) repeating steps (b) to (j) for a total of four to twelve cycles for conditioning the battery; and
- (j) performing steps (b) to (g) to charge the battery.

23. The method of conditioning a battery of claim 22, wherein steps (b) to (j) of the method are repeated for a total of six to ten cycles to condition the battery.

24. The method of conditioning a battery of claim 22, further including:
- the controller of the impulse battery charger comprising a timer and being configured for placing the switching module, upon expiration of the timer, in the first configuration;
- a current between the inductor and the battery induced by placement of the switching module in the second configuration rising from 0 Amperes to a maximum value at a first average rate and declining from the maximum value to 0 Amperes at a second average rate that is lower than the first average rate;
- the controller alternating the switching module between the first configuration and the second configuration at a rate of between 1 and 1,000,000 times per second; and
- the timer being set to at least a known period of time required for the inductor to discharge to 0 Amperes.

25. The method of conditioning a battery of claim 22, further including the controller being programmed to cycle the impulse battery charger through steps (c) to (f) until the voltage measured reaches the voltage specification for the battery, to decrease power in subsequent cycling through steps (c) to (f) so as not to exceed the voltage specification, and to turn off the impulse battery charger when the battery stops absorbing power.

* * * * *